(12) United States Patent
Schultz et al.

(10) Patent No.: US 9,731,567 B1
(45) Date of Patent: Aug. 15, 2017

(54) HIGH VISIBILITY RETRACTABLE SAFETY STRAP AND METHODS FOR SECURING A TRAILER TO A TOWING VEHICLE

(71) Applicants: John G. Schultz, Issaquah, WA (US); Denise S. O'Daniel, Issaquah, WA (US)

(72) Inventors: John G. Schultz, Issaquah, WA (US); Denise S. O'Daniel, Issaquah, WA (US)

( * ) Notice: Subject to any disclaimer, the term of this patent is extended or adjusted under 35 U.S.C. 154(b) by 0 days.

(21) Appl. No.: 15/175,405

(22) Filed: Jun. 7, 2016

(51) Int. Cl.
*B60D 1/28* (2006.01)
*B60D 1/18* (2006.01)

(52) U.S. Cl.
CPC *B60D 1/28* (2013.01); *B60D 1/18* (2013.01)

(58) Field of Classification Search
CPC ............ B60D 1/18; B60D 1/182; B60D 1/28
See application file for complete search history.

(56) References Cited

U.S. PATENT DOCUMENTS

| | | | |
|---|---|---|---|
| 6,336,683 B1 | 1/2002 | Akiba | |
| 6,772,711 B2 * | 8/2004 | Morgan | A01K 27/006 119/795 |
| 7,011,418 B2 | 3/2006 | Adams | |
| 7,364,315 B2 * | 4/2008 | Chien | A41D 27/085 362/103 |
| 7,806,483 B2 * | 10/2010 | Schultz | B60D 1/58 298/8 T |
| 8,707,595 B2 | 4/2014 | Beemsterboer et al. | |
| 8,726,467 B1 | 5/2014 | Smith | |
| 2016/0367845 A1 * | 12/2016 | Bouquier | A62B 35/0075 |

* cited by examiner

*Primary Examiner* — Kevin Hurley
(74) *Attorney, Agent, or Firm* — Ryan Kromholz & Manion, S.C.

(57) ABSTRACT

A high visibility retractable safety strap and a method for securing a trailer to a towing vehicle is disclosed. The retractable safety strap is coupled to either the trailer or the towing vehicle. The high visibility nature of the strap increases safety for other motorists by making the presence of the coupling between the trailer and towing vehicle more perceivable. The safety straps also provide redundancy should the main coupling between the trailer and towing vehicle become detached.

1 Claim, 4 Drawing Sheets

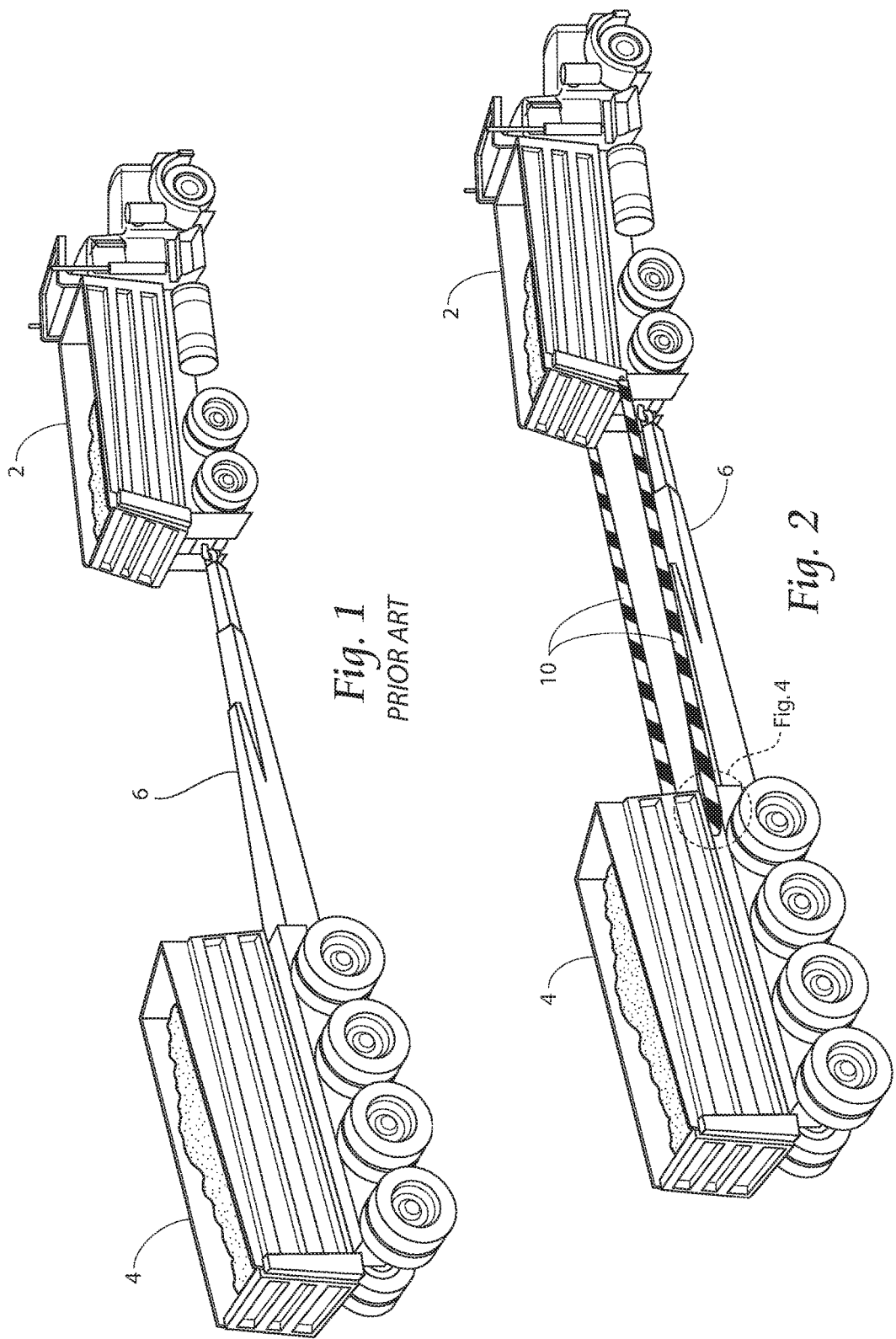

HIGH VISIBILITY RETRACTABLE SAFETY STRAP AND METHODS FOR SECURING A TRAILER TO A TOWING VEHICLE

BACKGROUND OF THE INVENTION

The present invention relates to an improved method of securing trailers to the vehicle that is towing the trailer.

Frequently, a commercial truck-trailer tows a second semi-trailer which is referred to as a "pup trailer." Pup trailers are commonly towed by a towing vehicle such as a dump truck where permitted by motor vehicle regulations. These types of trailers are used to increase the effective payload capacity of a single dump truck to allow a single motor vehicle to tow more payload than it ordinarily could.

Trucks of this type can extend and shrink the distance between the truck and pup-trailer by a switch in the cab of the truck. The connection between the truck and trailer can be shorter at the jobsite for maneuverability, and longer when over-the-road to spread the payload to decrease pressure on roads.

Drivers of other vehicles often have difficulty in seeing the pup trailer following the towing truck, or have difficulty is seeing the coupling that couples the towing vehicle with the pup trailer. This could create dangerous conditions, particularly regarding pup trailers that have a long coupling. Drivers who do not see the coupling could potentially merge into the coupling during lane change maneuvers.

SUMMARY OF THE INVENTION

A high visibility retractable safety strap and a method for securing a trailer to a towing vehicle is disclosed. The retractable safety strap is coupled to either the trailer or the towing vehicle. The high visibility nature of the strap increases safety for other motorists by making the presence of the coupling between the trailer and towing vehicle for perceivable. The safety straps also provide redundancy should the main coupling between the trailer and towing vehicle become detached.

BRIEF DESCRIPTION OF THE DRAWINGS

FIG. 1 is a perspective view of a towing vehicle of the prior art;

FIG. 2 is a perspective view of the towing vehicle, coupling and straps of the present invention;

DESCRIPTION OF THE PREFERRED EMBODIMENT

Figure 3:
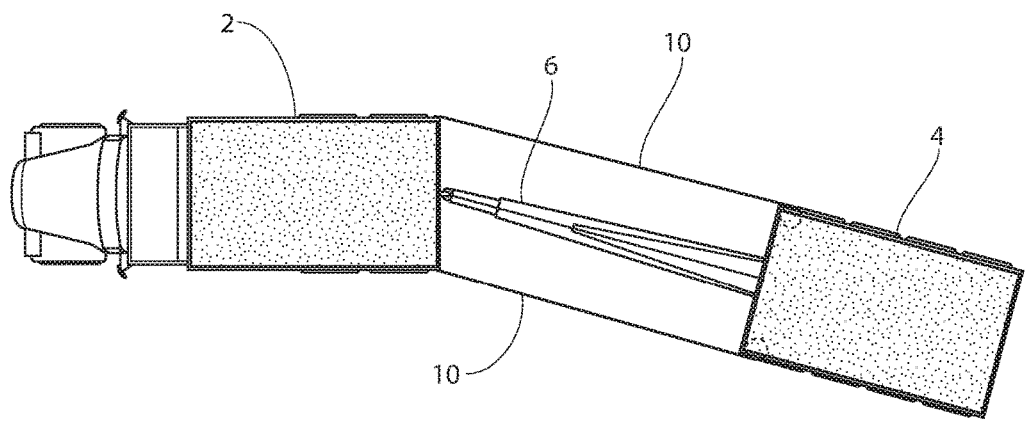
FIG. 3 is a top view of a towing vehicle, a coupling between the towing vehicle and a trailer, and the high visibility retractable safety straps of the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Referring now to FIG. 1, a towing vehicle 2 is shown towing a pup trailer 4 by means of a coupling 6.

It is noted that often the coupling 6 between the trailer 4 and towing vehicle 2 is be below eye-level and sight level for passing vehicles, so its presence is difficult to perceive, and often times dangerous.

Referring now to FIG. 2, a perspective view of the towing vehicle 2, coupling 6 and straps 10 of the present invention are shown. In this view, it is apparent that the straps 10 effectively would assist passing vehicles with viewing the coupling 6, and to some extent providing a barrier to prevent vehicles from merging into the coupling 6.

Retractable safety straps 10 are shown coupled between the towing vehicle 2 and the pup trailer 4. It is preferable to provide two safety straps 10, both at a left and a right lateral extent of the towing vehicle 2. The high visibility nature of the ribbon 14 of the straps 10 increases safety for other motorists by making the presence of the coupling 6 between the trailer 4 and towing vehicle 2 more perceivable.

Therefore, it is preferable that the ribbon 14 of the straps 10 be of a high visibility nature, such as reflective or brightly colored. It is also preferable that the ribbon 14 of the straps 10 be placed at such a height so that their presence would be about eye-level for passing vehicles. It is also preferable that the ribbon 14 of the straps 10 be placed at the left and right lateral extent of the towing vehicle 2 such that the ribbon 14 of the straps 10 would provide at least a minimal form of a barrier so that passing vehicles would not merge into the coupling 6.

In one embodiment, the straps 10 could provide redundancy should the main coupling 6 between the trailer 4 and towing vehicle 2 become detached. In this regard, if it is desired that the straps 10 serve this purpose, the ribbon 14 of the straps 10 could be manufactured of a material with a high tensile strength, providing for a factor of safety type strength in relation to the expected payload of the trailer 4, accounting for acceleration and additional strain on an outside strap when turning corners. A hook 12 of the strap 10 would likewise be robustly equipped in relation to the maximum payload capacity of the trailer 4.

Referring now to FIG. 3, a top view of a towing vehicle 2 is shown, with an associated trailer 4 and associated coupling 6 for attaching the trailer 4 to the towing vehicle 2.

Figure 4:
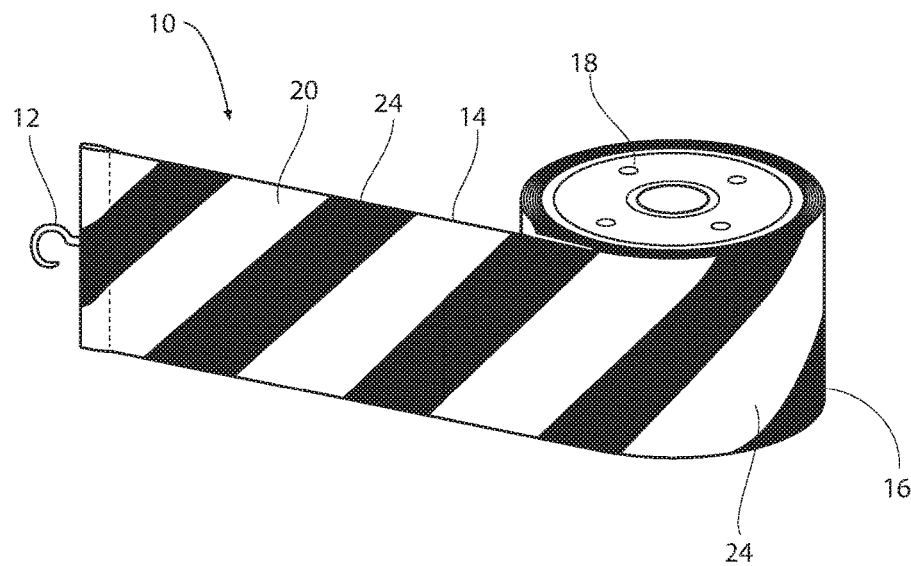
FIG. 4 is a perspective view of the straps, with the straps shown in a detached condition in relation to the vehicle and the trailer.

Referring now to FIG. 4, a perspective view of a single strap 10 is shown. Notably, the strap 10 is in a detached condition in relation to the vehicle 2 and the trailer 4.

In one embodiment of the present invention, a housing 16 carries a retracting mechanism such as is well known in the vehicle seat belt or tape measure art. Such retraction mechanisms typically comprise biased recoil springs, such as those shown in U.S. Pat. Nos. 4,474,340 and 4,194,703, both of which are incorporated by reference as though fully set forth herein. Preferably, the housing 16 provides for a weather resistant barrier to protect the retracting mechanism and the unused portion of the ribbon 14. The ribbon 14 is shown in this embodiment with alternating stripes 20 and 22 of reflective material and high visibility colored material, respectively. Other bright, loud and distinctive patterns could be applied to the ribbon 14 as desired. A slot 24 on a periphery of the housing 16 is provided to guide ribbon 14 back into the housing 16 during retraction. The slot 24 also serves to remove debris such as dirt and snow from the ribbon 14.

It is preferred that the retracting mechanism bias tension on the ribbon 14 to encourage shortening (infeed) of the strap 10, for instance shortening the inside strap 10 during a turn of the truck or during shortening of the coupling 6. Although tension is preferably biased, the retracting mechanism would also allow outfeed of the ribbon 14 during extension of the coupling 6, or for the outside strap 10 during a turn of the truck.

In one embodiment, the retracting mechanism is provided with a dampener to keep the ribbon 14 of the strap from whipping in a violet retraction, such as frequently happens during retraction of a tape measure.

The housing 16 may be coupled to either the trailer 4 or the truck 2. It is preferable that the housing 16 of the strap 10 is coupled to the trailer 4, so that if the truck 2 is not pulling a trailer 4, the safety strap is a non-issue, and there would be no extra cost applied to the truck 2. Additionally, this arrangement would minimize wear and tear on the strap 10, because the strap 10 would only be exposed to the elements when the trailer 4 is in use, not always when the truck 2 is in use, with or without the trailer 4.

The coupling between the housing 16 and the intended target may be through either the use of bolts or the like through voids 18 in the housing 16, or could a more readily detachable quick disconnect coupling, depending on user preference.

Although a hook 12 is shown for coupling a distal end of the ribbon 14, other mechanisms, such as quick connect, male-female or the like can be carried by the ribbon 14 for attachment to the other of the trailer 4 or the truck 2.

In an alternative embodiment of the present invention straps 10 can be made of an elastomeric material as opposed to, or in addition to, being retractable. During turns, inside straps 10 would have the tendency to slacken, and outside straps 10 have the tendency to stretch. For this reason, it is desirable that the inside strap 10 be able to remain taut during such turns, despite their tendency to slacken due to the decreasing distance between the on the inside. Elasticity or retraction, or a combination of both can accomplish the goal the ability to remain taut but not overstretched despite either lengthening or shortening of the strap 10.

In another alternative embodiment of the present invention, lighting, such as fiber optic lighting, can be either imbedded in or carried by the straps 10.

Figure 5:
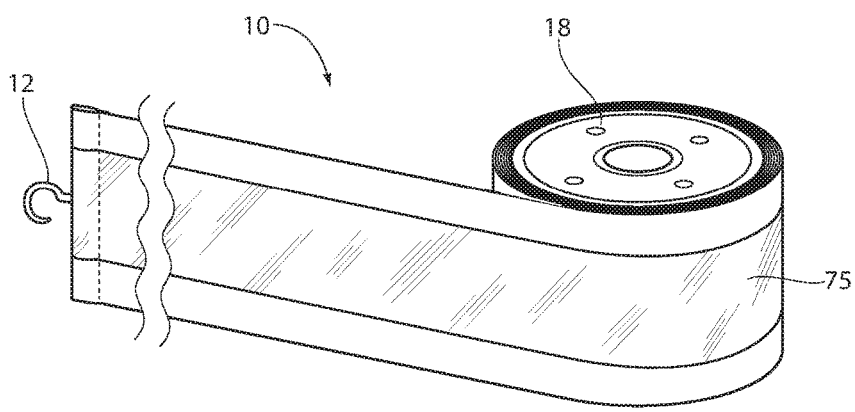
FIG. 5 is a perspective view of a strap with a single sided visual enhancement.
Figure 5A:
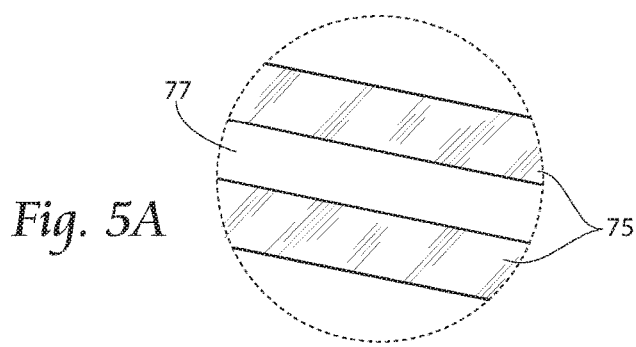
FIG. 5a is an alternate embodiment of a single sided visual enhancement.

Referring now to FIG. 5 a perspective view of a strap 10 with a single sided visual enhancement 75 is shown. In the embodiment shown, enhancement 75 is a reflective material, but as mentioned previously, the enhancement can vary based on user preference. An alternate embodiment of a single sided visual enhancement 75 is shown in FIG. 5_a_, and in this version, two strips of reflective material 75 are provided over base material 77.

Figure 6:
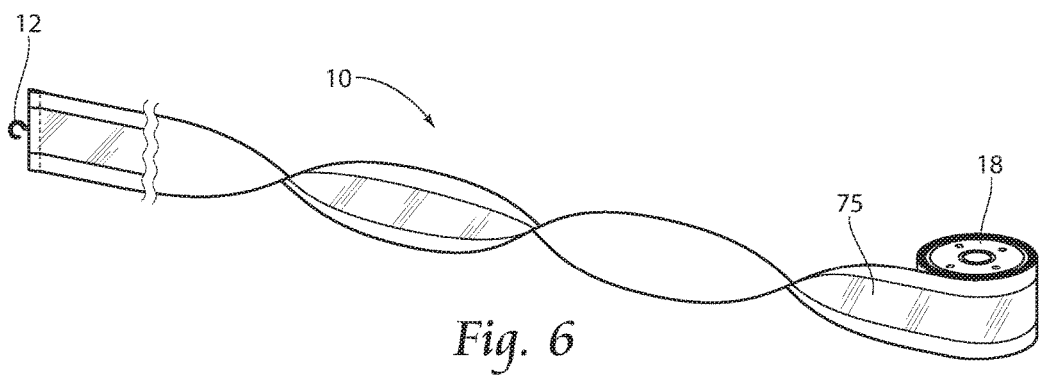
FIG. 6 is a perspective view of a strap with a single sided visual enhancement, provided in a twisted manner.
Figure 7:
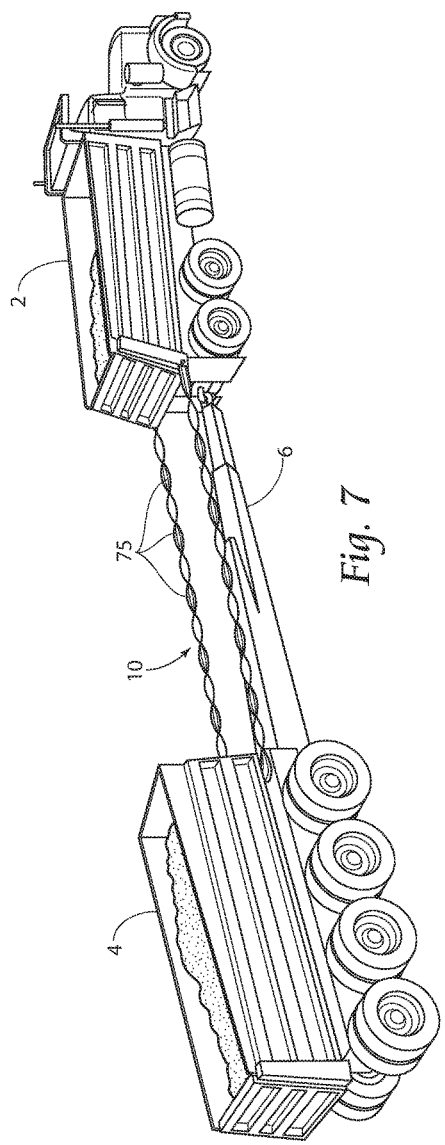
FIG. 7 is a perspective view of the towing vehicle, coupling and straps of the present invention, with a single sided visually enhanced strap provided in a twisted configuration between the towing vehicle and towed vehicle.

Referring now to FIG. 6, in a preferred embodiment, the strap 10 with a single sided visual enhancement 75 is provided in a twisted manner. After base installation of the housing 16 to a vehicle (see, e.g., FIG. 7, the user imparts twists to the strap 10 prior to attaching hook 12 to the other of the towed or towing vehicle. Referring to FIG. 7, the combination of the single sided visual enhancement 75 and the twisted strap 10 provides surprisingly positive visual feedback to nearby drivers. Namely, the twists cause the visual enhancement 75 to appear broken or dashed. This signals very visibly to passing drivers that the strap is indicative of a potential hazard between the towing and towed vehicle. The twists also have the beneficial of reducing turbulence or vibration caused by the straps provided in a flat configuration.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method of securing a safety mechanism between a towing vehicle and a trailer being towed by said towing vehicle, said method comprising:
    providing a strap having a first visually enhanced surface selected from the group consisting of reflective material, illuminated material, or fluorescent material on a first side of said strap, and a second side of said strap different than said first visually enhanced surface;
    imparting a plurality of twists to said strap;
    coupling said strap between said towing vehicle and said trailer.

* * * * *